United States Patent Office 3,165,548
Patented Jan. 12, 1965

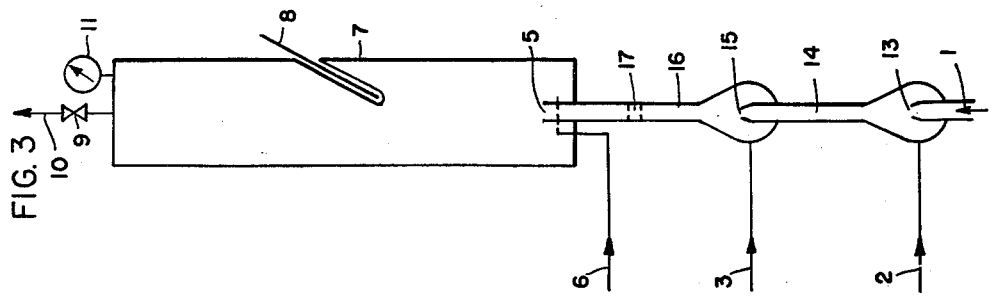
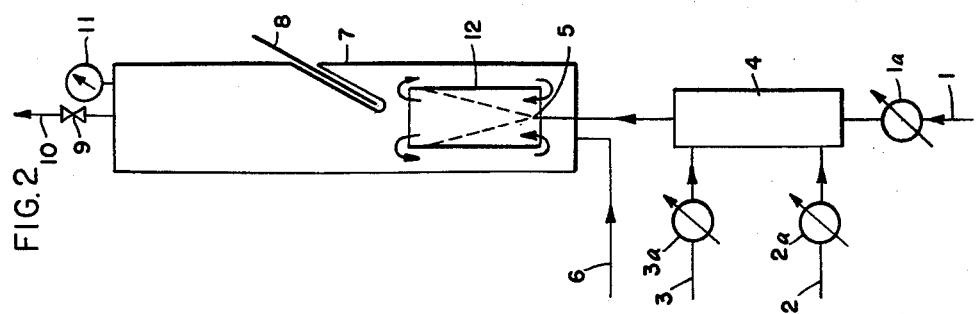
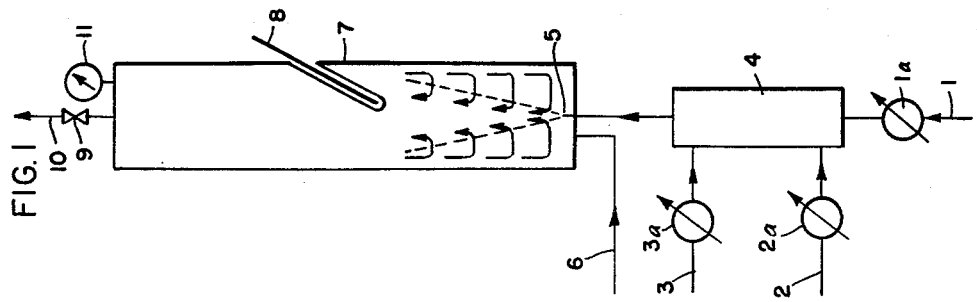

3,165,548
CONTINUOUS PROCESS FOR THE PRODUCTION OF AROMATIC AND HETEROCYCLIC CARBOXYLIC ACIDS
Ernst Bartholomé, Heidelburg, and Hans Nienburg, Richard Sinn, Karl Scherf, and Adolf Kreyer, Ludwigshafen (Rhine), Germany, assignors to Badische Anilin- & Soda-Fabrik Aktiengesellschaft, Ludwigshafen (Rhine), Germany
Filed Apr. 19, 1962, Ser. No. 188,759
Claims priority, application Germany, Jan. 14, 1960,
B 56,245; Apr. 21, 1961, B 62,224
9 Claims. (Cl. 260—524)

This invention relates to a safe method of carrying out oxidations using nitric acid. More particularly the invention relates to the oxidation of compounds of aromatic nature having oxidizable side chains to the corresponding carboxylic acids.

It is known to oxidize aromatic compounds which contain oxidizable side chains with nitric acid at an elevated temperature and increased pressure to form the corresponding carboxylic acids. A method of carrying out this oxidation in the presence of catalysts or oxygen-containing gases is also known. German patent specification No. 820,308 describes a method of carrying out the reaction in a vertically arranged pressure vessel which at its upper end has a cooled gas space. Nitric acid and the alkylaromatic compound to be oxidized are introduced separately into the reactor. A liquid level is maintained in the reactor. The liquid reaction products are withdrawn at the bottom and the gaseous reaction products at the top. In this kind of oxidation, highly explosive mixtures are liable to form in the gas space by condensation of para-xylene and $NO_2$ at the cooler parts of the apparatus.

To avoid such dangerous condensations it is proposed in German printed application No. 1,046,017 to spray the gas space with water. The content of $NO_2$ in the gas space is thus strongly decreased but the possibility of dangerous condensations is not entirely precluded.

In the process of British Patent No. 698,157, a gas space is also present at the upper end of the vertical tubular reactor. The initial materials are pumped separately into the bottom of the reactor and the reaction products are withdrawal with the waste gases at the upper end below the gas space. This process thus has the same disadvantages as the preceding ones.

In the process of British Patent No. 793,192, the initial materials are supplied together through a pipe provided at the side at the lower end of the vertical reactor. Moreover, oxidizing gas is introduced at the bottom. The mixture of the reaction products is withdrawn at the upper end of the reactor through an overflow and cooled in a descending condenser. Regeneration of the nitric acid is carried out at the same time. It is true that this method of carrying out the reaction in cocurrent avoids a gas space, but the reaction zone must be kept within a narrow temperature range by heating and cooling elements provided outside the reactor.

The process of German printed application No. 1,065,-845 uses a vertical reactor of which the upper half is kept cool and the lower half hot. Nitric acid is introduced at the top and the substance to be oxidized at the middle. The liquid reaction products are withdrawn at the lower end of the reactor and the waste gases at the upper end. There are great risks inherent in this method by reason of the cool gas space at the upper end of the reactor.

German printed application No. 1,051,840 describes a process in which oxidation is carried out in cocurrent in a horizontal tubular reactor. The process requires heating and cooling elements arranged outside the reactor wall to control the reaction temperature. Moreover, the reactor has a gas space at the upper tube wall.

All the known methods require external heating or cooling of the reactor for controlling the reaction temperature. Such an arrangement reacts fairly slowly to changes in temperature in the reaction chamber and does not ensure accurate control of so dangerous a reaction as the oxidation for example of para-xylene with nitric acid under pressure.

It is an object of the present invention to provide a process by which the nitric acid oxidation of compounds of aromatic nature having oxidizable side chains can be carried out in a manner which is absolutely safe in operation and involves no explosion hazard. Another object of the invention is to provide a process for the adiabatic performance of nitric acid oxidation of compounds which have aromatic nature and oxidizable side chains. These and other objects and advantages will be better understood from the following detailed description in conjunction with FIGURES 1 to 3 of the accompanying drawings in which apparatus suitable for carrying out the process according to the invention are shown diagrammatically.

We have found that the nitric acid oxidation of cyclic mononuclear or binuclear compounds of aromatic nature which contain oxidizable side chains to the corresponding carboxylic acids can be carried out at an elevated temperature and increased pressure, possibly in the presence of catalysts and/or oxygen-containing gases in a vertical reactor through which the reactants flow upwardly, without the formation of explosive mixtures and with absolute safety and reliability in operation by premixing the initial material, nitric acid and possibly diluent water for the nitric acid in a mixing apparatus at a temperature below the reaction temperature, leading this mixture with turbulent flow into the bottom of the reactor, reducing the velocity of flow of the mixture to at least one third upon entry into the reactor, carrying out the oxidation adiabatically, and withdrawing the reaction products at the upper end of the reactor while avoiding a gas space at the upper end of the reactor. By decreasing the velocity of flow upon entry into the reactor, a vortex is formed and the entering jet sucks hot reaction product to the point of entry of the premixed initial material. In this way, the oxidation reaction is initiated immediately at the point of entry, the location of the reaction zone thereby being fixed.

The other conditions of the process are those which are customary in nitric acid oxidation.

The process is carried out at a temperature between 150° and 400° C., advantageously between 180° and 300° C., and at increased pressure, for example between 10 and 150 atmospheres, especially between 50 and 120 atmospheres.

Oxidation can be carried out in the presence of catalysts, for example oxides and salts of metals of Groups IVA, IIB, VB, VIB, VIIB or VIII of the periodic chart of the elements. Examples of suitable catalysts are mercury nitrate, vanadium pentoxide, molybdenum trioxide, tungsten trioxide, chromium nitrate, iron nitrate, nickel nitrate and ammonium vanadate. The catalyst may be supplied with the diluent water or with the nitric acid or with both. The presence of a catalyst is however not essential.

It may be suitable to coemploy oxygen-containing gases, especially when it is desired to avoid reduction of nitric acid to non-regeneratable nitrous oxide and nitrogen. The introduction of the oxygen-containing gas advantageously takes place prior to the mixing zone. It is then uniformly distributed in the initial products and utilized to the optimum extent in the reaction zone.

Nitric acid with a concentration of about 10 to 40% by weight is used. It is possible either to use dilute nitric acid of this concentration or to employ concentrated nitric acid of more than 40% by weight concentration and dilute it with water to the desired concentration when the reactants are mixed.

The relative proportions of nitric acid and compounds to be oxidized depends on the number of oxidizable side chains and the concentration of the nitric acid. Since the oxidation of a methyl group proceeds according to the equation $-CH_3 + 2HNO_3 = -COOH + 2H_2O + TNO$ at least the amount of nitric acid required according to this equation should be used. In general, however, an excess of nitric acid of up to about 20% should be used because consumption is increased by a number of side reactions.

The process according to this invention may be used for the oxidation of the following groups of mononuclear and binuclear compounds of aromatic nature: benzene derivatives, naphthalene derivatives, pyridine derivatives and quinoline derivatives containing at least 1 and preferably 2 or more (up to 6; in the case of pyridine derivatives, up to 5) oxidizable side chains with 1 to 4 carbon atoms. By the term "oxidizable side chains" we mean all groups which may be oxidized to carboxyl groups, i.e. alkyl groups, partly oxidized alkyl groups, or alkyl groups partly substituted by halogen atoms. The partly oxidized alkyl groups may contain hydroxyl groups, aldehyde groups or keto groups. Besides alkyl groups, the term "oxidizable side chains" therefore includes, for example, hydroxyalkyl groups, esterified hydroxyalkyl groups, aldehyde groups, keto groups, monochloroalkyl groups and dichloroalkyl groups. Furthermore, these derivatives contain ($x$-1) inert substituents, where x is an integer from 1 to 4. These inert substituents may be nitro groups, halogen atoms or carboxyl groups.

The initial materials may be used as pure compounds or in admixture with each other, for example in the form of commercially available mixtures of isomers.

The following are examples of initial materials which may be used:
methylbenzene,
ethylbenzene,
n-propylbenzene,
iso-propylbenzene,
n-butylbenzene,
secondary-butylbenzene,
dimethylbenzenes,
diethylbenzene,
di-n-propylbenzenes,
di-iso-propylbenzenes,
di-n-butylbenzenes,
di-secondary-butylbenzenes,
trimethylbenzenes,
triethylbenzenes,
tri-n-propylbenzenes,
tri-isopropylbenzenes,
tri-n-butylbenzenes,
tri-secondarybutylbenzenes,
ethyltoluenes,
ethyl-n-propyltoluenes,
ethyl-isopropyl-toluenes,
ethyl-secondary-butyltoluenes,
diethyl-toluenes,
diethyl-n-propyltoluenes,
diethyl-isopropyltoluenes,
diethyl-secondary-butyltoluenes,
triethyl-toluenes,
triethyl-n-propyltoluenes,
triethyl-isopropyltoluenes,
triethyl-secondary-butyltoluenes,
n-propyl-ethylbenzenes,
iso-propylethylbenzenes,
n-butyl-ethylbenzenes,
secondary-butylethylbenzenes,
dimethyl-ethylbenzenes,
di-n-propylethylbenzenes,
di-isopropylethyl-benzenes,
di-n-butylethylbenzenes,
di-secondary-butyl-ethylbenzenes,
trimethylethylbenzenes,
tetraethylbenzenes,
tri-n-propylethylbenzenes,
tri-isopropylethylbenzenes,
tri-n-butylethylbenzenes,
tri-secondary-butylethylbenzenes,
isopropyl-n-propylbenzenes,
n-butyl-n-propylbenzenes,
secondary-butyl-n-propylbenzenes,
dimethyl-n-propylbenzenes,
di-isopropyl-n-propylbenzenes,
di-n-butyl-n-propylbenzenes,
di-secondary-butyl-n-propylbenzenes,
trimethyl-n-propylbenzenes,
triethyl-n-propylbenzenes,
tri-n-propylbenzenes,
tri-isopropylbenzenes,
tri-n-butyl-n-propylbenzenes,
tri-secondary-butyl-n-propyl-benzenes,
n-butyl-isopropylbenzenes,
secondary-butyl-isopropyl-benzenes,
dimethyl-isopropylbenzenes,
diethyl-isopropylbenzenes,
di-isopropylbenzenes,
di-n-propyl-isopropylbenzenes,
di-secondary-butyl-isopropylbenzenes,
trimethyl-isopropylbenzenes,
triethyl-isopropylbenzenes,
tri-isopropylbenzenes,
tri-n-butyl-isopropylbenzenes,
isobutyl-n-butylbenzenes,
dimethyl-isobutylbenzenes,
diethyl-isobutylbenzenes,
di-n-propyl-isobutylbenzenes,
di-isopropyl-isobutylbenzenes,
di-n-butyl-isobutylbenzenes,
di-secondary-butyl-isobutylbenzenes,
trimethylisobutylbenzenes,
triethyl-isobutylbenzenes,
tri-n-propyl-isobutylbenzenes,
triisopropyl-isobutylbenzenes,
dimethyl-secondary-butylbenzenes,
diethyl-secondary-butylbenzenes,
di-n-propyl-secondary-butylbenzenes,
di-isopropyl-secondary-butylbenzenes,
di-n-butyl-secondary-butylbenzenes,
trimethyl-secondary-butylbenzenes,
triethyl-secondary-butylbenzenes,
tri-n-propyl-secondary-butylbenzenes,
tri-isopropyl-secondary-butylbenzenes,
tri-n-butyl-secondary-butylbenzenes,
benzyl alcohol,
benzaldehyde,
toluyl alcohols,
toluyl aldehydes,
toluyl carboxylic acids,
acetophenone,
α-hydroxyethylbenzene,
hydroxymethyl-benzyl alcohols,
hydroxymethyl-benzaldehydes,
hydroxymethyl-toluyl carboxylic acids,
benzyl chloride,
xylylene chloride,
benzal chloride,
xylylene dichloride,
1-methylnaphthalene,
2-methylnaphthalene,
dimethylnaphthalenes,
2-methyl-1-hydroxymethyl-naphthalene and 2-methyl-1-chloromethyl-naphthalene.

Examples of initial materials containing inert substituents are nitrotoluenes, chlorotoluenes, bromotoluenes, nitroxylenes and chloroxylenes.

The following are examples of heterocyclic compounds may be used: α-, β- and γ-picoline, lutidines, collidines, 2-methylquinoline, 3-bromo-8-methylquinoline and 2-methyl-quinoline-5-aldehyde.

In the process according to the invention, the temperature of the mixture of the reactants (i.e., the oxidizable compound and the nitric acid) is at least 20° C. below the reaction temperature, but not above 180° C. There should be no reaction during the mixing. Mixing is carried out continuously in the usual manner. Mixing may be so intense that an emulsion is formed. When it is desired to use as initial material nitric acid with a higher concentration than is to be used in the oxidation, mixing of the nitric acid with water advantageously takes place together with or immediately prior to the mixing with the compounds to be oxidized.

The mixed reactants are supplied to the reactor while maintaining the turbulence. By turbulence we mean that the Reynolds number for the flowing mixture is above 2300.

Upon entry into the reaction chamber, the velocity of flow is decreased to at least one third. The velocity of flow may also be decreased to a much greater extent and, in the limiting case, the reactants may be introduced into a vessel containing a stationary liquid (velocity zero). The only important point is that, upon entry of the mixed reactants into the reaction chamber, a rise in temperature occurs immediately at the point of entry owing to hot reaction products being sucked back, so that oxidation occurs immediately.

The temperature in the oxidation zone can be adjusted in various ways, for example through the concentration of the nitric acid, the temperature increasing with the concentration of the nitric acid, or through the temperature at which the mixed but not yet reacting reactants are introduced into the reaction zone. If the concentration of the nitric acid used for the oxidation or the mixing temperature of the reactants is so low that oxidation in the reaction zone takes place very slowly and the increase in temperature occuring as a result of the exothermic reaction is too small, it is possible to produce the reaction temperature by directly blowing in steam at the point of entry of the reaction mixture into the reaction chamber. Another possibility for controlling the temperature comprises varying the pressure in the reaction chamber. The oxidation itself is carried out adiabatically, i.e. without any external heating or cooling of the reaction chamber. There is no heat exchange through the walls of the reaction chamber.

The process according to this invention will now be described with reference to FIGURE 1. Nitric acid is introduced through a pipe 1, diluting water for the nitric acid through a pipe 2, aromatic compound to be oxidized through a pipe 3 into a mixing apparatus 4. Preheaters 1a, 2a and 3a are provided. The mixing apparatus contains means for the intensive mixing or emulsification of the initial materials, for example a system of successive jet mixers or perforated screens. Such a system is illustrated in FIGURE 3. After mixing has taken place, the initial materials enter at the bottom of a vertical reactor 7. At the point of entry 5 the speed of the mixture or emulsion is decreased by the ratio of reactor cross-section to tube cross-section and the reaction is initiated because the initial material entering as a jet is immediately heated up to reaction temperature by sucking back hot reaction product (as indicated by the arrows). A pipe 6 is provided for the introduction of superheated steam. It serves for heating up the reactor or for controlling the reaction temperature in a manner described below. If steam is used for temperature control it must be introduced in such a way, for example through an annular tube surrounding the inlet tube for the premixed reactants, that the steam mixes with the reactants immediately upon entry. When carrying out the reaction in the way described above, the reaction is initiated without any delay and is absolutely safe because the location of the reaction zone is easy to control and any overheating which would lead to an uncontrollable course of the reaction is avoided. The oxidation products are withdrawn at the upper end of the reactor, possibly through a dip tube, decompressed through a valve 9 and supplied through a pipe 10 to the working up. A manometer 11 indicates the pressure in the reactor.

In the case of any aromatic compounds which are slow to react it may be advantageous to provide the reactor with a circulation tube. Such an arrangement is shown diagrammatically in FIGURE 2. By means of the circulation tube 12, hot substantially oxidized reaction product is returned to the point at which the reaction is initiated. The length of the circulation tube should be at least equal to the diameter of the reactor and advantageously equal to 2 to 20 times the reactor diameter; it is determined by the reaction speed at a given temperature.

An example of a mixing system comprising jets and mixing chambers is illustrated by way of example in FIGURE 3. The diluting water supplied through the pipe 2 is supplied with the nitric acid entering through nozzle 13 to a mixing zone 14, and the aromatic compounds supplied through pipe 3 passes with the dilute nitric acid flowing through nozzle 15 into the mixing chamber 16 in which complete mixing is brought about by means of perforated plates 17.

The temperature in the reaction zone is advantageously controlled by means of a control loop, the temperature in the reaction zone being measured by a thermocouple. The thermocouple is conveniently located at a point where complete mixing of the entering reaction mixture with the oxidation mixture has already taken place. The regulating member of the control loop influences either the amount of diluent water and consequently the concentration of the nitric acid, or the preheating temperature of the individual reactants, or the amount of steam for mixing with the reactants which is supplied beneath the reaction zone through pipe 6. The temperature of the reaction zone may also be controlled by the pressure in the oxidation tube. The reactor operates adiabatically in all cases and merely requires an insulation.

The invention is illustrated by but not limited to the following examples.

*Example 1*

To start oxidation, 80 liters of p-di-isopropylbenzene and 475 liters of 39% nitric acid per hour are intimately mixed in a mixing apparatus and then pumped through a tube 8 mm. in diameter into a pressure vessel according to FIGURE 1 which is 5 meters long and 90 mm. in diameter and which is lined with tantalum. As soon as oxidation has been initiated by heating up with steam, the reaction temperature is adjusted to 260° C. by using 86 liters per hour of diluent water. The mixture flowing into the reactor enters at a speed of 3.54 m. per second with turbulence (Reynolds' number 25900). Upon entering the reactor, the speed decreases to 2.79 cm. per second. The mixture reacts immediately. All the initial materials are pumped in at ambient temperature (15° C.). The pressure in the reactor is 70 atmospheres. The reaction product leaving at the upper end of the reactor is decompressed to atmospheric pressure and, after cooling and crystallizing out, is filtered off, washed with water and dried. 62.8 kilograms of terephthalic acid are obtained per hour, i.e. 89.4% of the theory.

*Example 2*

80 liters of p-xylene, 272 liters of 47% nitric acid and 433 liters of diluent water per hour are pumped, after intensive premixing, into the same apparatus as in Example 1 at a flow speed of 4.34 m. per second with turbulence (Reynolds' number 188000). Upon entry, the speed decreases to 3.42 cm. per second. The reaction temperature is controlled at 270° C. by keeping the preheating temperature for the nitric acid and diluent water at 170° C. The p-xylene is pumped in at 15° C. The premixed initial materials enter the reactor at 163° C. The pressure in the reactor is 75 atmospheres. Working up the oxidation product leaving the reactor gives 94.6 kilograms of terephthalic acid per hour, i.e., 88.2% of the theory.

*Example 3*

60 liters of crude xylene (composition: 25% of o-xylene, 60% of m-xylene, 12% of p-xylene and 3% of ethylbenzene), 204 liters of 47% nitric acid and 325 liters of diluent water per hour are intimately mixed in a mixing apparatus and then pumped through an inlet pipe 8 mm. in diameter into a pressure vessel according to FIGURE 2, 5 meters in length and 90 mm. in diameter with a circulation tube 2 meters long. The flow speed is 3.26 m. per second and the flow is turbulent (Reynolds' number 75000). Upon entry into the reactor the speed decreases to 2.57 cm. per second. The reaction temperature is controlled at 210° C. by setting the preheating of the nitric acid and diluent water at 120° C. The premixed initial materials enter the reactor at 84° C. The pressure in the reactor is 90 atmospheres. Working up of the reaction product gives 68 kilograms per hour of a mixture of phthalic acids, i.e., 84.4% of the theory.

*Example 4*

135 kilograms of p-nitrotoluene, 315 kilograms of 40% nitric acid and 286 kilograms of diluent water per hour are thoroughly premixed and pumped into the same apparatus as in Example 1 at a speed of 3.64 m. per second with turbulence (Reynolds' number 32700). Upon entry into the reactor, the flow speed decreases to 2.87 cm. per second. All the initial materials have a temperature of 20° C. The reaction temperature is controlled at 250° C. by supplying 54 kilograms per hour of steam at 100 atmospheres through pipe 6. The pressure in the reactor is 80 atmospheres. Working up the reaction product gives 150 kilograms per hour of p-nitrobenzoic acid, i.e., 91% of the theory.

*Example 5*

100 kilograms of γ-picoline and 372 kilograms of 40% nitric acid per hour are intensively premixed and then pumped, both at 20° C., at a flow speed of 2.22 m. per second with turbulence (Reynolds' number 21000) into the same apparatus as in Example 1. Upon entry into the reactor the speed of flow decreases to 1.76 cm. per second. The reaction temperature is controlled at 280° C. by means of the pressure, the necessary pressure being 100 atmospheres. Working up the reaction mixture gives 111 kilograms of isonicotinic acid per hour, i.e., 84.0% of the theory.

*Example 6*

60 kilograms of pseudocumene (1,2,4-trimethylbenzene) and 760 kilograms of 30% nitric acid per hour are pumped, after intensive premixing, into the same apparatus as in Example 1. Both initial materials have a temperature of 20° C. The Reynolds' number in the inlet tube is 36400. The speed of flow, which is 3.94 m. per second on entry, decreases in the reactor to 3.10 cm. per second. The reaction temperature in the reaction zone is 258° C. and the pressure in the reactor is 75 atmospheres. Working up the reaction product gives 78.8 kilograms of trimellitic acid per hour, i.e., 75% of the theory.

*Example 7*

40 kilograms of durene (1,2,4,5-tetramethylbenzene), 750 kilograms of 40% nitric acid and 750 kilograms of diluent water per hour are pumped, after intensive premixing, into the same apparatus as in Example 3. The durene and nitric acid are preheated to 100° C. and the diluent water to 200° C. at a pressure of 80 atmospheres. The Reynolds' number in the inlet pipe is 236000; the speed of flow, which in the inlet pipe is 1.72 m. per second decreases upon entry into the reactor to 6.08 cm. per second. The reaction temperature in the reaction zone is 240° C. and the pressure 80 atmospheres. Working up the reaction product gives 62 kilograms of pyromellitic acid per hour, i.e., 81.7% of the theory.

*Example 8*

71 kilograms per hour of 2-methylnaphthalene and 360 kilograms per hour of 20% nitric acid are mixed in a mixing apparatus and pumped through a tube 8 mm. in diameter into a tantalum-lined pressure vessel which is 5 m. in length and 9 mm. in diameter. The initial materials have a temperature of 20° C. The reaction temperature is adjusted to 260° C. by introducing 35 kilograms per hour of 100-atm. steam from below. The pressure in the reaction space is 75 atmospheres. The reaction product is worked up, and 74 kilograms per hour of β-naphthoic acid (i.e., 86% of the theory) is obtained.

*Example 9*

71.6 kilograms per hour of 4-methylquinoline and 475 kilograms per hour of 40% nitric acid are pumped into the same apparatus as in Example 1. The nitric acid is preheated to 60° C. 100-atm. steam is introduced at a rate of 20 kilograms per hour. The pressure in the reactor is 80 atmospheres, and the reaction temperature is 250° C. The reaction mixture is worked up, and 78 kilograms per hour of quinolinecarboxylic acid-(4) (i.e., 90% of the theory) is obtained.

This application is a continuation-in-part of application Serial No. 81,882, filed January 10, 1961, and now abandoned.

We claim:

1. In a continuous process for the production of aromatic carboxylic acids by oxidizing a compound having an aromatic nucleus and an oxidizable side chain with nitric acid of about 10 to 40 weight percent concentration, at an oxidation temperature of about 150° C. to 400° C. and under a pressure of about 10 to 150 atmospheres, the improvement which comprises: premixing the compound to be oxidized with nitric acid at a temperature below said oxidation temperature; leading the resultant mixture with turbulent flow in the form of a turbulent jet into the lower end of a vertically elongated reaction zone filled with reaction liquid and maintained adiabatically under said oxidation temperature and pressure, the velocity of flow of said mixture decreasing to at least one-third upon entry into said reaction zone so as to form a vortex with hot reaction product being sucked back to the point of entry of said mixture; avoiding a gas space at the upper end of said reaction zone; and withdrawing reaction product at the upper end of said reaction zone.

2. A process as claimed in claim 1 wherein the compound to be oxidized is xylene.

3. A process as claimed in claim 1 wherein the compound to be oxidized is para-xylene.

4. A process as claimed in claim 1 wherein the compound to be oxidized is p-di-isopropyl benzene.

5. A process as claimed in claim 1 wherein there is oxidized at least one p-dialkylbenzene in which the alkyl groups each have 1 to 4 carbon atoms.

6. A process as claimed in claim 1 wherein there is oxidized at least one compound selected from the class consisting of benzene, naphthalene, pyridine and quinoline as an aromatic nucleus substituted by at least one oxidizable side chain of 1 to 4 carbon atoms selected from the class consisting of alkyl, monochloroalkyl and dichloroalkyl and partly oxidized derivatives thereof.

7. A process as claimed in claim 1 wherein the nitric acid of from 10 to 40 weight percent concentration is prepared from more highly concentrated nitric acid and water immediately prior to mixing with the compound to be oxidized.

8. A process as claimed in claim 1, wherein at least one of the two reactants is preheated prior to mixing to a temperature of between room temperature and the oxidation temperature.

9. A process as claimed in claim 1, wherein the nitric acid of from 10 to 40 weight percent concentration is prepared from more highly concentrated nitric acid and water immediately prior to mixing with the compound to be oxidized and at least one of the three components nitric acid, compound to be oxidized and water is preheated prior to mixing to a temperature of between room temperature and the oxidation temperature.

References Cited in the file of this patent

UNITED STATES PATENTS

| | | |
|---|---|---|
| 2,800,504 | Elce et al. | July 23, 1957 |
| 2,905,688 | Illich | Sept. 22, 1959 |
| 3,081,307 | Avedikian | Mar. 12, 1963 |

FOREIGN PATENTS

| | | |
|---|---|---|
| 405,719 | Great Britain | Feb. 15, 1934 |
| 698,157 | Great Britain | Oct. 7, 1953 |
| 747,417 | Great Britain | Apr. 4, 1956 |

OTHER REFERENCES

Perry: ed. Chem. Engineer's Handbook, 3rd ed., 1950, page 582.

UNITED STATES PATENT OFFICE
CERTIFICATE OF CORRECTION

Patent No. 3,165,548                        January 12, 1965

Ernst Bartholomé et al.

It is hereby certified that error appears in the above numbered patent requiring correction and that the said Letters Patent should read as corrected below.

Column 1, line 46, for "withdrawal" read -- withdrawn --; line 63, for "Ntiric" read -- Nitric --; column 4, line 66, for "chcloride" read -- chloride --; column 8, line 2, for "1.72" read -- 7.72 --.

Signed and sealed this 1st day of June 1965.

(SEAL)
Attest:

ERNEST W. SWIDER                             EDWARD J. BRENNER
Attesting Officer                                Commissioner of Patents